March 26, 1957 J. A. MEUSEL 2,786,766

METHOD OF PRODUCING A FLAVORING COMPOSITION

Filed June 10, 1955

Jerome A. Meusel
INVENTOR.

BY Clarence A. O'Brien
and Harvey B. Jacobson
Attorneys

2,786,766
METHOD OF PRODUCING A FLAVORING COMPOSITION

Jerome A. Meusel, Baltimore, Md., assignor to The Baltimore Spice Company, Baltimore, Md., a corporation of Maryland Application June 10, 1955, Serial No. 514,509

6 Claims. (Cl. 99—140)

The present invention relates to food products and more particularly relates to methods for supplying flavorings to food products.

The primary object of the invention resides in a novel process for adding flavoring liquids to an absorbent carrier material in which form the flavoring liquids may be supplied or conveyed to the food products to be flavored.

An important object of the invention consists in providing absorbent carrier materials for the flavoring liquids which carrier materials possess natural anti-oxidant characteristics preventing deterioration of the flavors carried thereby.

An important object of the invention lies in the process for incorporating flavoring materials in natural spices, herbs, dehydrated vegetables, or other absorbent materials by subjecting the absorbent material to a vacuum and then introducing the flavoring liquids to the carrier while the carrier is still under vacuum whereby the flavoring liquids will flow into the voids created by the evacuated cells of the carrier.

A further object of the invention, ancillary to the preceding object, is in the release of the vacuum from the carrier materials after the flavoring liquids have been added thereto to further drive the flavoring liquids into the heart of the absorbent material.

Figure 1:
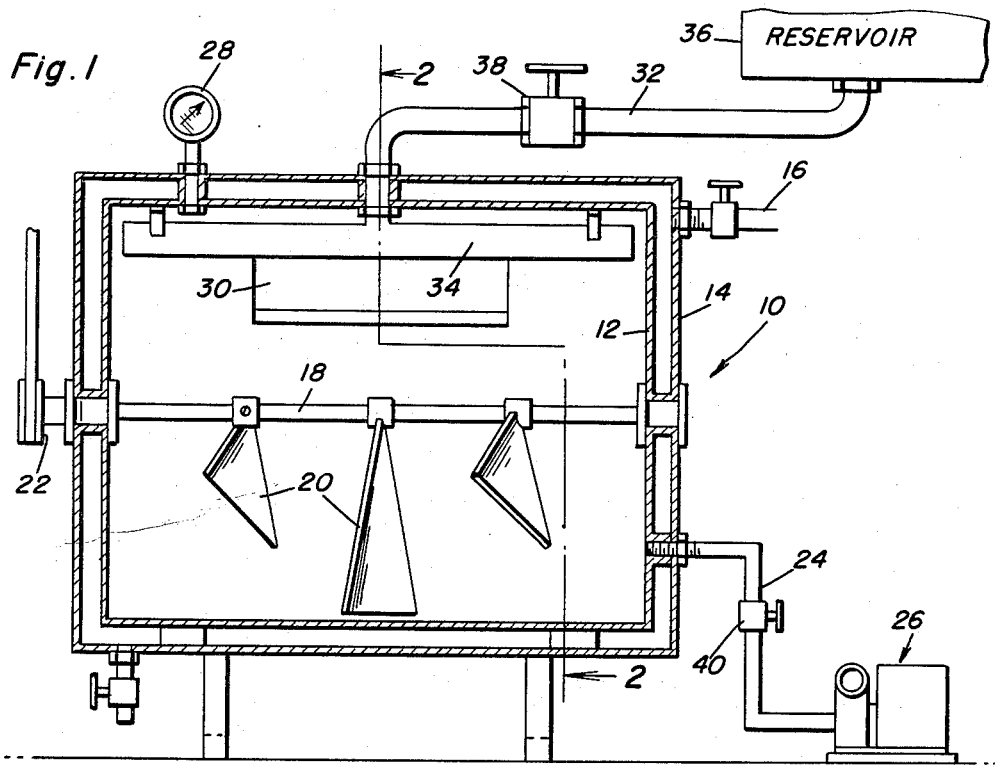
Figure 2:
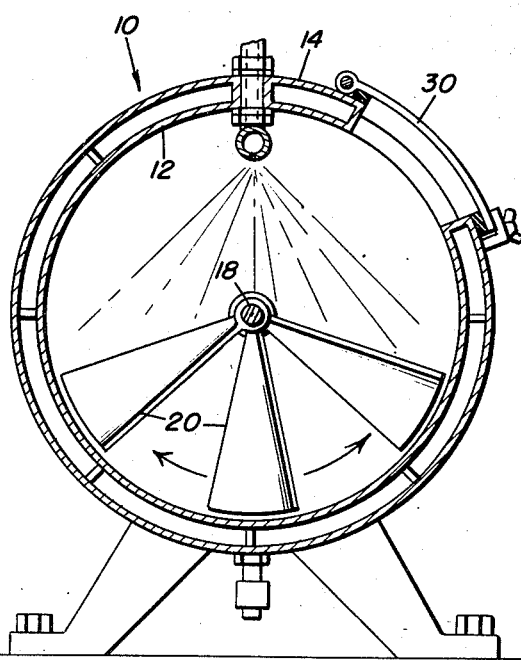

Other objects of the invention will appear as the description proceeds. A suitable apparatus for practicing the process is set forth in the accompanying drawing, wherein:

Figure 1 is a cross-sectional view through a suitable vacuum kettle equipped to receive and mix the carrier materials and flavoring materials in the practice of the invention; and Figure 2 is a cross-sectional view through the kettle.

Referring briefly to the apparatus in the drawing, there is shown a vacuum kettle 10 consisting of spaced inner and outer shells 12 and 14, the outer shell 14 forming a jacket for the inner shell or kettle 12, which jacket in the present instance constitutes a cooling jacket having a water or other cooling fluid line 16 opening thereinto. Extending longitudinally through the kettle 10 is a shaft 18 upon which are mounted suitable agitator blades or paddles 20. One end of the shaft 18 projects through one end of the kettle 10 and is provided with a suitable pulley or other driving means 22 on the ends of which the shaft is oscillated to move the paddles or agitator blades 20. Conduit 24 opens at its inner end into the kettle 10 and is attached at its outer end to a suitable vacuum pump 26 whereby a vacuum may be drawn on the interior of the kettle. A vacuum gauge 28 registers the amount of vacuum in the kettle and access door 30 provides access to the kettle for adding the absorbent carrier material to the kettle in the practice of the invention.

Feed line 32 opens into a spray head 34 extending longitudinally along the inner compartment 12 of the kettle and has the other end thereof disposed above the kettle and opening into a suitable reservoir 36 which is adapted to hold the flavoring materials or the like in the practice of the process.

In carrying out the process of the invention, the absorbent material is first introduced into the vacuum kettle through the access door 30 and then a suitable vacuum drawn from the interior of the kettle by means of the vacuum pump 26. After the vacuum has been drawn, the agitator blades 20 may be moved by oscillating the shaft 18 and while still under vacuum, valve 38 on conduit 32 is opened whereby the flavoring liquids or extracts to impregnate the absorbent material are admitted into the spray head 34 from whence they are sprayed into the interior of the kettle and thoroughly mixed with the absorbent material to partially impregnate and coat the absorbent material.

Then, the vacuum is released from the kettle by the opening of a suitable valve (not shown) bringing the interior of the kettle up to atmospheric pressure whereby the flavoring materials are completely driven into the absorbent carrier materials.

Although the inventive process is capable of wide utilization, it is particularly effective in supplying flavoring materials subject to deterioration through oxidation to food products by incorporating these flavoring materials by impregnation into a suitable absorbent carrier having anti-oxidant properties, which carrier itself constitutes a suitable flavoring or seasoning if desired.

The method has found particular utility in the impregnation of bland spices with various essential oils and spice extractives. A vacuum is drawn on the bland spice to remove the air from the cells and voids of the spice; the spice extractives and essential oils are then sprayed onto the spice while the spice is retained under vacuum so that the extractives and essential oils flow easily into the voids of the spice. Then, the vacuum is released from the now flavoring material coated spices so that the flavoring materials in the form of the spice extractives and essential oils are positively driven into the spice. Since all spices have a natural anti-oxidant effect, the utilization of these spices as absorbent carriers for various essential oils and extractives prevents these essential oils and extractives from oxidizing even after they have been incorporated into the food product being flavored. The net result of the process is therefore a suitable vacuum impregnated seasoning or spice.

A specific example is given below in the impregnation of coriander seeds with various essential oils and extractives in the formation of a dill seasoning.

Example

A vacuum kettle, such as 10, having a capacity of 60 gallons had 100 pounds of clean coriander seeds dumped thereinto.

The kettle was hermetically sealed and a vacuum pump such as 26 attached to the kettle 10 through the medium of a suitable conduit as 24 was started to aspirate the air from the kettle.

Removal of the air from the kettle, from the voids in the seeds, and from the plant cells themselves required 20 minutes of sustained partial vacuum at from 29 inches to 30 inches of mercury. The evacuation was carried out at room temperature. In this connection, in the event the temperature within the vacuum kettle reaches more than 80° F., cold water may be run through the double jackets of the kettle to lower the temperature of the contents to prevent excessive volatilization of the essential oils and spice extractives upon their introduction into the kettle.

After satisfactory evacuation, the kettle was isolated from the vacuum pump by closing the valve 40 in the vacuum line to the pump. The mechanical agitator within the kettle is then started in order to mix and agitate the seeds within the kettle.

The mixture of essential oils and extractives, which have been previously added to the reservoir 46, are now admitted into the kettle 10 by opening the valve 38, these materials being sprayed into the kettle through the spray ports of the spray pipe 34. Thus, the essential oils and extractives are uniformly distributed over the surface of the seeds within the kettle. After all the oils and extractives have been introduced, valve 38 is closed and the partial vacuum retained on the kettle.

While still retaining the partial vacuum, the agitator paddles are moved to continue the mixing action between the seeds, oils and extractives for approximately 10 minutes.

At the end of this tentative period, the oils and extractives have been uniformly coated on the surfaces of the seeds. Then, a valve on the kettle leading to the atmosphere is opened and air slowly allowed into the kettle.

It takes approximately 2 minutes for the inside of the kettle to come to atmospheric pressure. The agitator is run while this is taking place so that the oil is uniformly driven into the cellular spaces of the spice by atmospheric pressure. The kettle is then opened and the vacuum impregnated spice removed.

In the impregnation of the coriander seeds, the amount of oil and extractives is limited to a maximum of approximately 10% by volume of the coriander seeds. Obviously, this amount will vary with the different absorptive capacities of various spices.

The essential oils and extractives utilized to impregnate the adsorbent material in the form of the coriander seeds in the formation of the dill seasoning of this example was a mixture of oil of dill weed, allspice, cassia, cloves, coriander and nutmeg, oleoresin of ginger, celery and natural extractives of fresh garlic.

Even though the coriander seeds are wet with oil before the vacuum is released from the kettle, the seeds will be comparatively dry and somewhat darker in color than originally when removed from the kettle.

Inasmuch as all spices have a natural anti-oxidant effect, the process is equally applicable to all spices and is in no respect limited to the specific example set forth which is set forth solely for the purposes of illustration.

The process may be carried out under certain circumstances without the use of a vacuum, the impregnation occurring through material absorption of the flavoring materials into the absorbent carrier.

From the foregoing, the invention will be readily apparent to those skilled in the art, and it is desired to limit the process only to the extent required by the appended claims.

What is claimed as new is as follows:

1. A method for adding flavoring liquids to an absorbent material which comprises drawing a vacuum on the absorbent material to withdraw the air from the cells of the material, adding the flavorings to the material while the material remains under vacuum and then releasing the vacuum from the material to drive the flavorings further into the absorbent material.

2. A method for supplying flavoring materials subject to deterioration through oxidation to food products which comprises impregnating an absorbent material having anti-oxidant properties by first subjecting the absorbent material to a vacuum, then adding the flavoring materials to the absorbent material while the absorbent material is retained under a vacuum, then increasing the pressure of the absorbent material to drive the flavoring material into the cells of the absorbent materials.

3. A method for supplying flavoring materials subject to deterioration through oxidation to food products which comprises impregnating an absorbent material having anti-oxidant properties by first subjecting the absorbent material to a vacuum, then adding the flavoring materials to the absorbent material while the absorbent material is retained under a vacuum, then increasing the pressure of the absorbent material to drive the flavoring material into the cell of the absorbent materials, mixing the absorbent material and flavoring materials with one another until the flavoring material generally uniformly coats the absorbent material, then releasing the vacuum on the absorbent material to drive the flavoring materials into the cells of the absorbent material.

4. The method of claim 1 wherein the absorbent material is a bland spice.

5. The method of claim 1 wherein the absorbent material is coriander seeds.

6. The method of claim 1 wherein the flavoring liquids are essential oils and spice extractives.

References Cited in the file of this patent

UNITED STATES PATENTS

| 2,284,822 | Heller | June 2, 1942 |
| 2,358,250 | Rogers et al. | Sept. 12, 1944 |
| 2,375,278 | Buxton | May 8, 1945 |

FOREIGN PATENTS

| 432,396 | Great Britain | July 25, 1935 |